H. HAMMOND.
FRUIT CONVEYER.
APPLICATION FILED NOV. 1, 1909.

976,871.

Patented Nov. 29, 1910.

WITNESSES:

INVENTOR:
Hugh Hammond

UNITED STATES PATENT OFFICE.

HUGH HAMMOND, OF ROCHESTER, NEW YORK.

FRUIT-CONVEYER.

976,871.  Specification of Letters Patent.  Patented Nov. 29, 1910.

Application filed November 1, 1909. Serial No. 525,837.

*To all whom it may concern:*

Be it known that I, HUGH HAMMOND, a citizen of the United States, and resident of Rochester, in the county of Monroe and State of New York, have invented certain new and useful Improvements in Fruit-Conveyers, of which the following is a specification.

This invention relates to fruit conveyers, and the purpose is to convey fruit unharmed from the tree to the ground as fast as it is picked.

The device is designed for use in connection with an ordinary ladder, but might be made a self-supporting structure without departing from the spirit of this invention.

Figure 1:
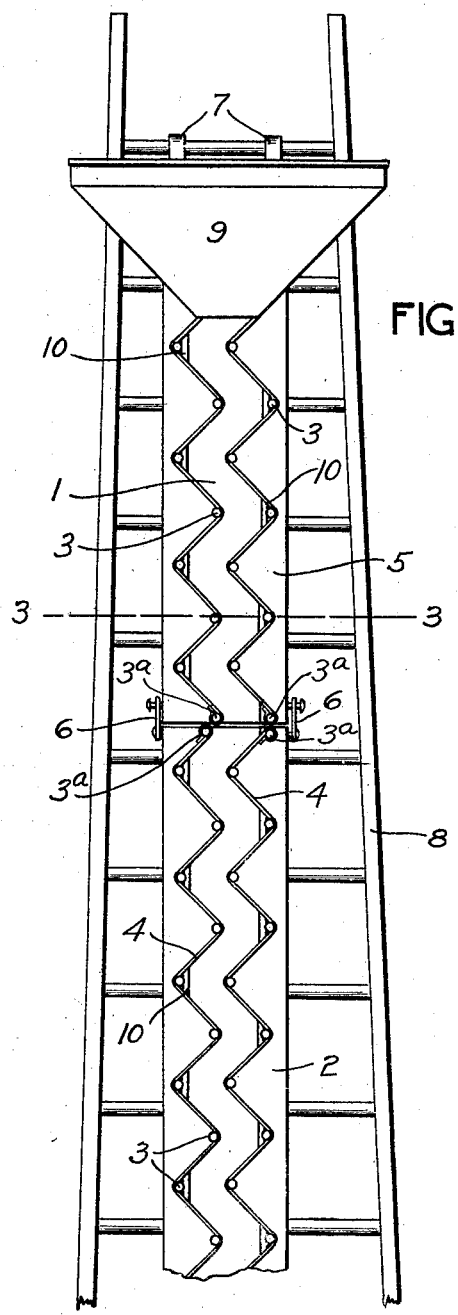
Figure 2:
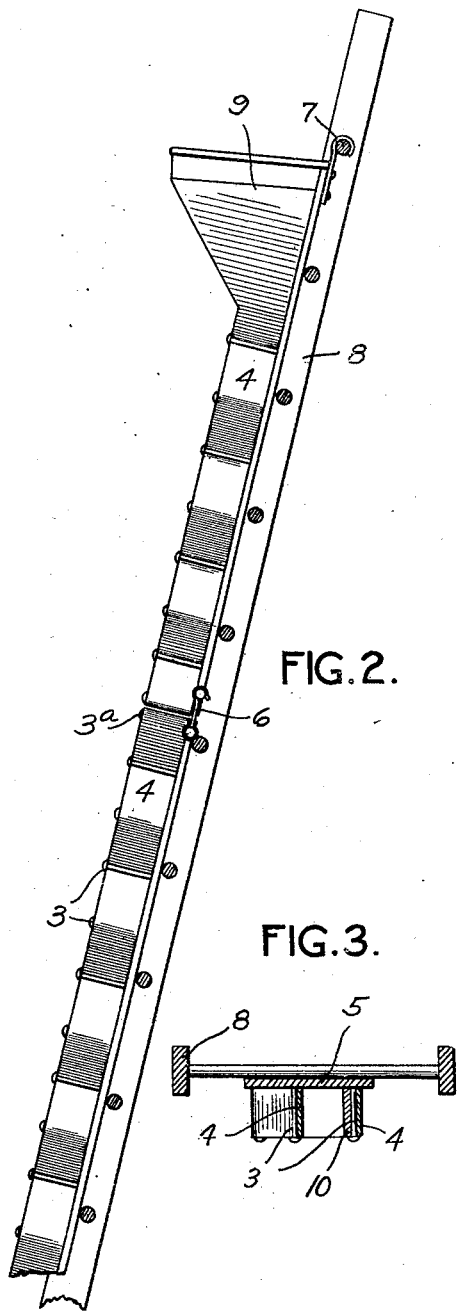
Figure 3:
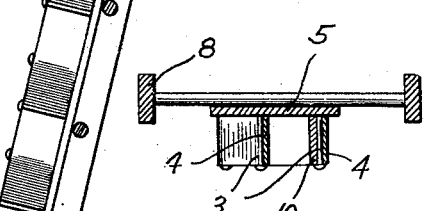

In the drawings:—Figure 1 is a front elevation of the device as it appears in use; Fig. 2 is a side elevation of the same, one side of the supporting ladder being removed; and Fig. 3 is a sectional plan view taken on the line 3—3 of Fig. 1.

In the form in which the conveyer is shown, it comprises a zigzag or staggered chute 1, open on one side, through which, when supported in upright position, fruit passes, and is retarded in its passage so that it falls gently out from its lower end.

A convenient way of constructing the chute 1 is to provide first a board 2 with two staggered rows of studs 3, 3, at equal distances apart, that project at right angles to the face of the board, and that have enlarged heads on their outer ends (Fig. 3), and then to stretch along each staggered row of studs a strip of flexible material 4, such as canvas for example, each strip passing alternately outside and inside of a stud. The canvas strips 4, 4 are of a width equal to the length of the studs from the under side of their heads to the board 2, and so are held in position by the heads of the studs, with their inner edges against the board (see Fig. 2). This leaves the chute open on one side only.

The conveyer can be made in sections, as shown in the drawings, in order to adapt it for different elevations, and so that it can be handled and transported readily. When so made the staggered rows of studs are made to correspond on the different sections, and those at the ends of the sections that meet are placed close to such ends so that a continuous passage through the chute is formed. The sections are secured one to the other by hooks 6, 6, or other suitable means.

The upper section, as shown in the drawings, is equipped with hooks or similar attachments 7, 7, that are adapted to engage a rung of a ladder 8. This upper section of the chute may also be provided with a hopper 9 at its upper end, into which the apples can be dropped.

It is apparent from Fig. 1 of the drawings that fruit, such as apples for example, cannot fall vertically through the conveyer a distance greater than the width of the chute before it strikes one of its sides, when it will roll down that side and strike the side opposite, and so on through the length of the chute. As the direction of the rotation of the apple is necessarily reversed each time it strikes one of the sides, that will cause it to be retarded, and it will not gain sufficient momentum to bruise itself when it reaches the ground. As a ladder when used for picking fruit is usually slanted toward the tree (Fig. 2), there is no tendency for the fruit to leave the open side of the chute at any point, and by being open on the side away from the ladder, can receive fruit at any point. An additional safeguard against bruising the fruit may be provided by fastening pads 10 in the inner corners of the chute, and this is particularly desirable when the fruit is small, for otherwise it might strike the studs 3. But the pads are unnecessary when the size of the fruit approximates the distance between the strips 4, 4.

What I claim is:—

A fruit conveyer having, in combination, two series of pins arranged in staggered parallel alinement, a strip of flexible material arranged in zig-zag position about each series of pins to form a zig-zag passage between said strips, and a yielding cushion fixed to said strip in each inner corner of said passage and inside of the pin in said corner, to prevent contact between the fruit and the pins.

HUGH HAMMOND.

Witnesses:
D. GURNEE,
L. THON.